May 15, 1962 W. S. AUSHERMAN 3,034,513
REVERSIBLE BAR FOR THRESHING CYLINDERS
Filed June 26, 1959
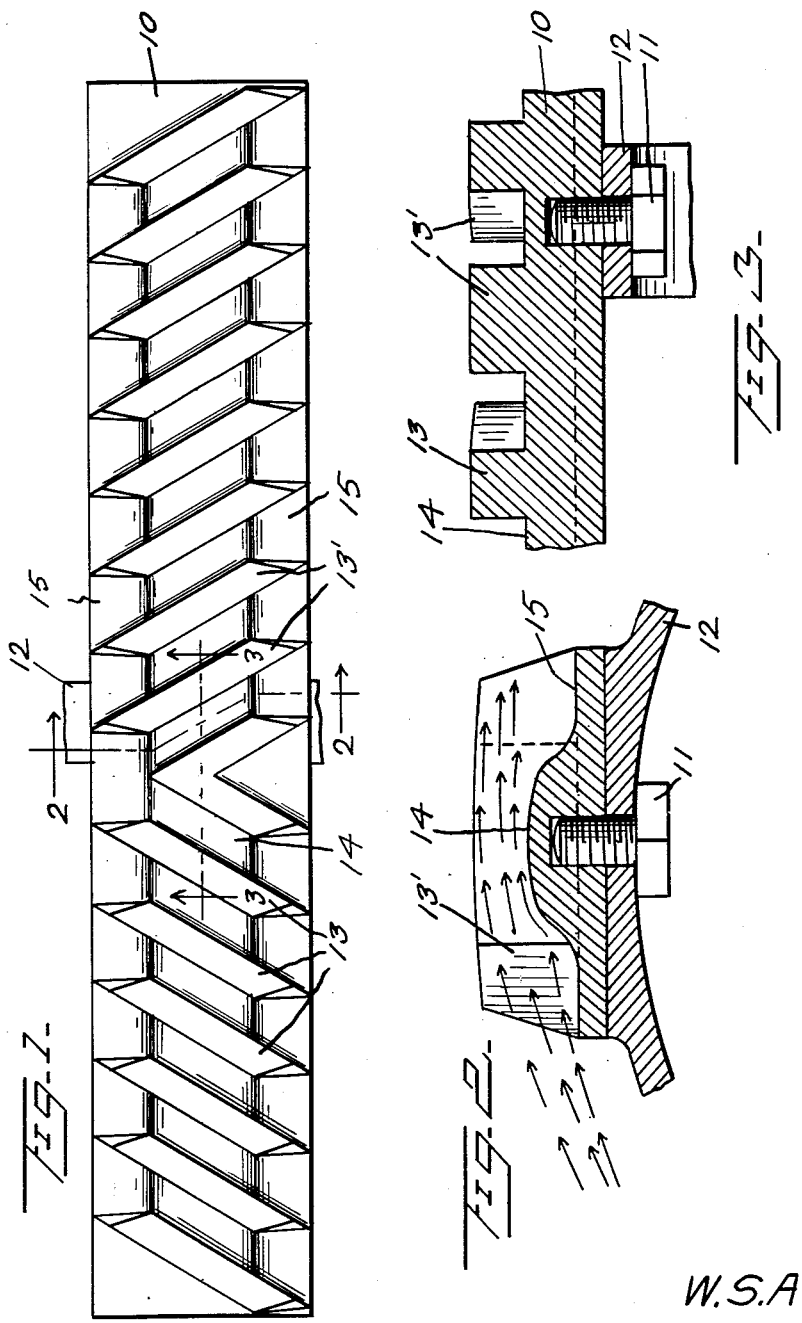
W.S. Ausherman
INVENTOR United States Patent Office 3,034,513
Patented May 15, 1962

3,034,513
REVERSIBLE BAR FOR THRESHING CYLINDERS
William S. Ausherman, 3500 N. Topeka, Wichita, Kans.
Filed June 26, 1959, Ser. No. 826,102
5 Claims. (Cl. 130—27)

This invention relates to an improved reversible rasp bar for use on the threshing cylinders of combines.

The present invention is broadly an improvement over the Rasp Bar for Grain Threshing Cylinders, which is the subject matter of my prior Patent No. 2,256,010.

It is the object of the present invention to provide an improved threshing cylinder bar which will have a longer service life than the similar article as at present known.

It is a further object of the present invention to provide an improved threshing cylinder bar which will attain greater efficiency, in that it will remove or separate a greater percentage of the grain from the straw than the known threshing cylinder bars.

Still other objects, advantages and improvements will become apparent from the following specification, taken in connection with the accompanying drawing, in which:

FIGURE 1 is a top plan view of the improved threshing cylinder bar according to the present invention.

FIG. 2 is a detail sectional view on the line 2—2 of FIG. 1, showing the rasps or teeth, of the threshing bar and their mounting on the threshing cylinder; and FIG. 3 is another detail sectional view on the section line 3—3 of FIG. 1 showing the details of rasps or teeth, on the threshing bar.

Referring now in detail to the drawings, the improved reversible rasp bar is shown generally in FIGURE 1 and a plurality of such bars are secured at uniform circumferentially spaced intervals around a threshing cylinder, partially shown at 12, in parallel relation to the axis of the latter, by cap screws 11. It will be noted that my present rasp bar construction is applicable to threshing cylinders, on which a backing plate is normally used, as shown in FIG. 4 of my earlier patent, but that the present construction does not contemplate the use of a backing plate. As is well known in the art, the threshing cylinder 12 cooperates with one or more concaves (not shown) to effect the threshing of the heads and separation of the grain from the straw.

The rasp bar is comprised of an elongated horizontal base or web 10 having two sets of upstanding parallel teeth 13 and 13' thereon that in their lateral extent are transversely disposed on the web 10 and oppositely inclined to the longitudinal axis of the web 10. The sets of teeth 13 and 13' are displaced longitudinally on the web 10 and are contiguous so that the teeth at the juncture of the two sets of teeth are of a V-shaped configuration.

An important feature of the rasp bar is that the juncture of the sets of teeth 13 and 13' is eccentically disposed along the length of the rasp bar or the web 10. In other words, reversing the rasp bar end for end results in the juncture of the sets of teeth 13 and 13' not being coincident with the previous position occupied thereby. This affords the advantage of such junctures of successive bars (alternately reversed on a threshing cylinder) not tracking or traveling the same path, whereby a relatively different wear rate of teeth adjacent junctures of oppositely inclined teeth can be avoided and a more even distribution of material along the length of the threshing cylinder attained.

According to the present invention there is provided between adjacent pairs of teeth of the sets of teeth 13 and 13', a fillet 14 which extends from a line on one side of the longitudinal axis of the web 10, and spaced inwardly from one edge of the latter to a corresponding line on the other side of the web 10, and also spaced inwardly from the edge of the latter, by an equal distance. Between the side of the fillet 14 and the respective edges of the web 10 there are formed spaces of greater depth than over the fillet 14. Through the use of this fillet the rasps or teeth of the sets thereof 13 and 13', can be made higher than would otherwise be the case. This construction prolongs the life of the rasps, without in any way diminishing their threshing capacity. The unthreshed heads of the grain travel from the deeper edge section between the teeth of the sets of teeth 13 and 13' adjacent one of the relatively lower and substantially horizontal lateral marginal upper surfaces 15 of the web 10 and thence up over the fillet 14, as shown by the arrows in FIG. 2, to be moved radially outward into closer contact with the concave (not shown), which action forces separation of the grain from the head. If the fillets 14 were not present, many of the heads of grain would slip through between the web 10 and the concave (not shown) without being threshed.

It will be noted that the surface of the fillet 14 defines a relatively raised surface area of the web 10 which surface smoothly merges with the substantially horizontal surfaces of the lateral and marginal portions 15 of the web 10. Further, inspection of FIGURE 2 shows that the upper surface of the web 10 is symmetrical with respect to the longitudinal and vertical median plane of the web. In other words, the upper vertical and transverse configuration of the web 10 is such along at least a portion of the length of the web 10 as to be defined by a line having a point of symmetry with such line commencing at one lateral side of the web 10 as a substantially horizontal line that smoothly curves upward, thence smoothly curves to the horizontal, and thence continues to the point of symmetry. Such point of symmetry being at the transverse center of both the web and also contiguous to the centers of the lateral extents of the teeth of sets 13 and 13'.

It will be observed on further inspection of FIGURE 2, that each of the teeth of the sets 13 and 13' extend throughout substantially their entire lateral extent upwardly to terminate at an approximately horizontal surface. Preferably such approximately horizontal surface is, as shown, a cylindrical surface defined by a radius substantially greater than the height of the teeth of the sets 13 and 13' and centered at a position substantially below the web 10.

It will also be plain on inspection of the drawing that the lateral extremities of teeth of the sets of teeth 13 and 13' disposed adjacent the lateral sides of the web 10 are beveled to sharp edges that are vertically inclined.

Having fully described my invention what I claim as new and useful and desire to secure by Letters Patent of the United States is:

1. An improved reversible rasp bar for threshing cylinders having two sets of teeth thereon, one set inclined to a positive acute angle with respect to the transverse axis of the bar and the other inclined at a negative acute angle with respect to said axis, and a fillet on the bar intermediate each two adjacent teeth, said fillet having curved ends merging with said bar and terminating at both ends short of the edges of the bar.

2. The subject matter as claimed in claim 1, and said bar and fillet having aligning threaded openings, the threaded openings and fillet terminating short of the curved surface of said fillet, and a bolt extending into said aligning threaded openings on the interior of a threshing cylinder, for securing said rasp bar to such threshing cylinder.

3. A rasp bar of the type including a horizontal and elongated web having a set of parallel and upstanding teeth thereon that in their lateral extent are arranged transversely on the web in a direction inclined in the horizontal plane to the longitudinal axis of the web, said teeth terminating at their upper extremities throughout substantially their entire lateral extent to conform substantially with a generally horizontal surface; in combination, said rasp bar being characterized by said web along at least a portion of its length having a relatively raised surface underlying at least some of said teeth that is spaced inwardly from one lateral side of the web and from the lateral extremities of the teeth adjacent said one lateral side of the web, said raised surface being of a height less than said horizontal surface, said raised surface of the web being defined by the web having an upper vertical and transverse configuration along at least a portion of the length of the web that is a line having a point of symmetry, said line having a shape proceeding from said one lateral side of the web that is initially substantially horizontal, thence smoothly curving upward, thence smoothly curving to the horizontal, and thence continuing horizontally to the point of line symmetry.

4. The combination of claim 3, including a second set of parallel and upstanding teeth on the web that is longitudinally displaced from and coterminous with the first mentioned set of teeth, said second set of teeth being inclined to the longitudinal axis of the web in a direction opposite to that of the first mentioned set of teeth, said second set of teeth terminating at their upper extremities throughout their lateral extent to conform substantially with said generally horizontal surface with at least some of such teeth being disposed in part on the said raised surface of the web.

5. The combination of claim 4, wherein the juncture of the sets of teeth is eccentrically disposed with respect to the length of the rasp bar.

References Cited in the file of this patent
UNITED STATES PATENTS

| 717,043 | Snyder | Dec. 30, 1902 |
| 2,301,536 | Greenwood et al. | Nov. 10, 1942 |

FOREIGN PATENTS

| 2,674 | Great Britain | 1873 |
| 1,442 | Great Britain | 1882 |
| 18,485 | Great Britain | 1895 |